June 3, 1969

R. H. FLORY 3,447,290

SEPARATOR FOR DISENTRAINMENT OF MATERIAL FROM
A GASEOUS FLUID STREAM

Filed Sept. 18, 1967

INVENTOR.
RALPH H. FLORY

BY

ATTORNEY

United States Patent Office 3,447,290
Patented June 3, 1969

---

3,447,290
SEPARATOR FOR DISENTRAINMENT OF MATERIAL FROM A GASEOUS FLUID STREAM
Ralph H. Flory, Waynesboro, Pa., assignor to Frick Company, Waynesboro, Pa., a corporation of Pennsylvania
Filed Sept. 18, 1967, Ser. No. 668,366
Int. Cl. B01d 45/14
U.S. Cl. 55—322                                                6 Claims

ABSTRACT OF THE DISCLOSURE

The fluid separator comprises an open ended, cylindrical filter screen coaxially mounted for rotation within a vessel. The vessel is provided with an inlet to receive a gaseous fluid containing entrained material to be separated, which inlet is positioned to discharge the gaseous fluid into an open end of the filter screen. A plurality of vanes associated with the filter screen and positioned to be impinged by the gaseous fluid to thereby cause rotation of the screen and the gaseous fluid stream to assume a spiral flow path within the filter screen. A first outlet is provided in said vessel for receiving the cleaned gaseous fluid stream and a second outlet for the removal of disentrained material.

---

This invention relates to fluid separators and, more particularly, to a centrifugal type separator for removal of liquid and solid contamination entrained in a gaseous fluid stream.

In refrigeration systems it is desirable to remove oil entrained in the compressed refrigerant gas discharged from the compressor because such oil carry-over has an adverse effect upon the heat transfer efficiency of the evaporator. To achieve separation of oil from the refrigerant gas, separators are connected between the compressor and condenser to receive the refrigerant gas discharged from the compressors. Heretofore the separators have employed baffles to effect separation by impingement and changing the direction of gas flow. Separators have also employed porous packing material through which the gaseous fluid stream is caused to flow to effect separation of the oil. None of these various separators have proved entirely satisfactory since an undesirable amount of oil carry-over still occurred.

Accordingly, it is an object of the present invention to provide an improved fluid separator which more effectively removes entrained fluid and solid contamination from a gaseous fluid stream. Another object of this invention is to provide an improved fluid separator of relatively simple and compact construction.

A feature of this invention is the provision of a rotatable screen, the rotation of which is achieved by the utilization of part of the energy in the flow of the gaseous fluid stream.

The present invention, therefore, contemplates an improved separator comprising a vessel to which a gaseous fluid, such as a refrigerant gas, containing entrained contamination, such as oil, grit or water, is delivered under pressure, as from a compressor, and in which a separating screen of cylindrical configuration is rotatably supported. The screen is associated with vane assemblies which are so constructed and arranged that the gaseous fluid flow by impinging the vane assemblies imparts rotation to the screen and causes the gaseous fluid stream to assume a spiral flow path. The spiral flow path of the gaseous fluid stream utilizes the centrifugal effect on the more dense contaminating material to cause it to move laterally and into impingment with the screen. The rotation of the screen functions to continuously effect unblinding of the screen by causing, under centrifugal force, the separated oils and other contaminating materials to be propelled outwardly into impingment against the inner wall surfaces of the vessel. This action removes the material from the gas stream and thereby minimizes the possibility of reentrainment of the separated material. Outlet means is provided in the vessel to remove the cleaned gaseous fluid stream, while another outlet means is provided for removal of the disentrained material.

The invention will be more fully understood from the following description when considered in connection with the accompanying drawing in which.

Figure 1:
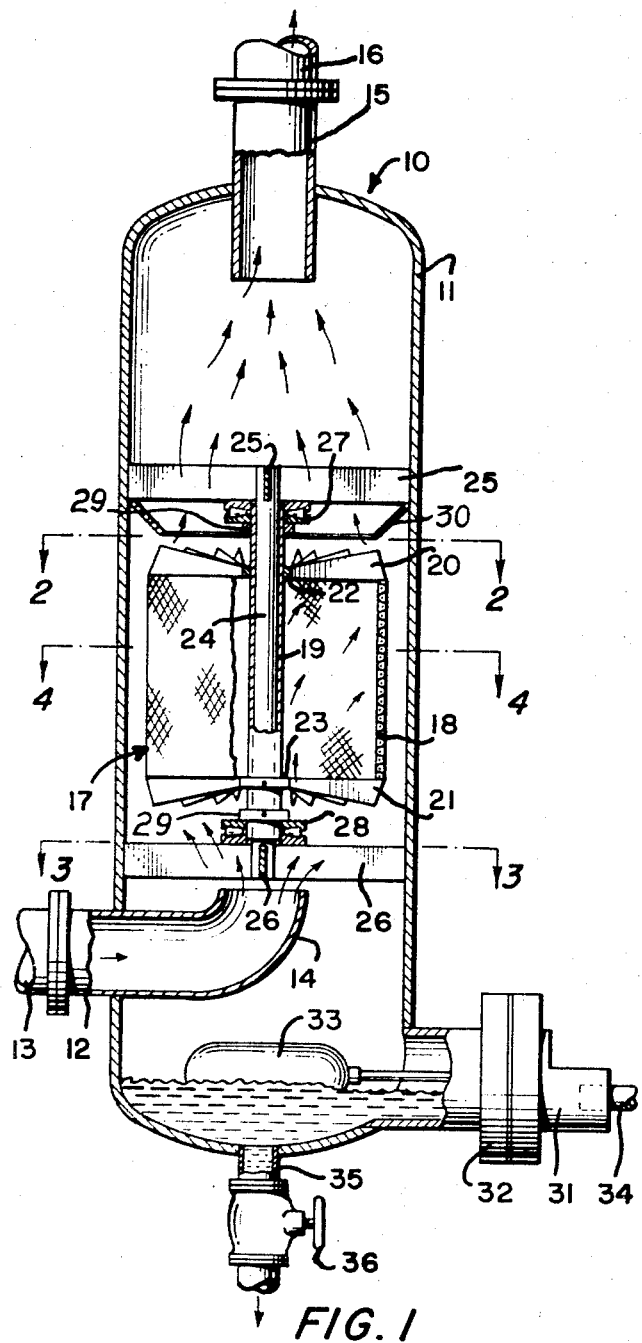
FIG. 1 is a longitudinal cross sectional view of the separator according to this invention.

Now referring to the drawing, reference numeral 10 generally designates the separator according to this invention which will be described as employed in a refrigeration system to receive gaseous refrigerant from which entrained compressor lubricating oil is to be removed although the separator has other applications where removal of entrained material from a gaseous fluid stream is desired.

Figure 2:
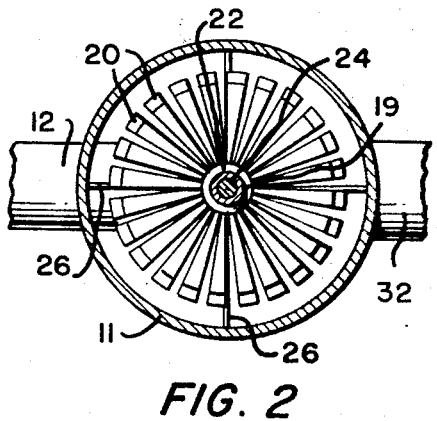
FIG. 2 is a transverse view in cross section taken substantially along line 2—2 of FIG. 1.
Figure 3:
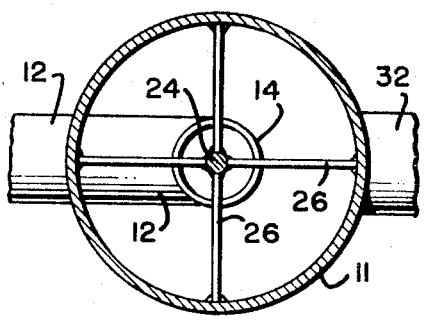
FIG. 3 is a transverse view in cross section taken substantially along line 3—3 of FIG. 1.
Figure 4:
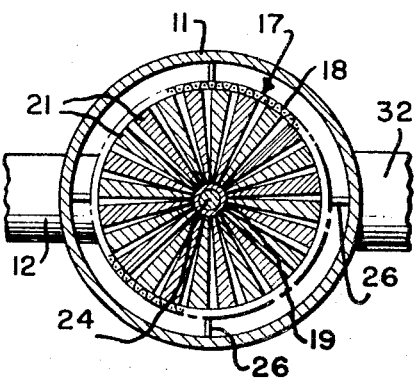
FIG. 4 is a cross sectional view taken substantially along line 4—4 of FIG. 1.

As shown in FIG. 1, separator 10 comprises an elongated shell or vessel 11, having adjacent its lower end a gaseous fluid inlet connection 12 which is connected by a pipe 13 to the discharge side of a compressor (not shown). The pipe 13 has a bent portion 14 disposed to discharge compressed, gaseous refrigerant into vessel 11 upwardly and centrally of the latter. A gaseous fluid outlet connection 15 is disposed in the top of vessel 11 to receive cleaned gas and pass the gas to a pipe 16 for delivery to a place of use or storage, such as a condenser (not shown). Disposed within vessel 11 between the inlet connection 12 and the outlet connection 15 is a screen assembly 17. The screen assembly 17 comprises an open ended, cylindrical screen 18 which is connected to a tubular shaft or column 19 by vanes 20 and 21. Vanes 20 are radially disposed across the upper open end of screen 18 (see FIG. 2) and are secured at their inner ends to a collar 22 and at their outer end portions to the screen. Similarly, vanes 21 are radially disposed across the lower open end of screen 18 (see FIG. 4) and are secured at their inner ends to a collar 23 and at their outer end portions to the screen. Vanes 20 and 21 are constructed and arranged so that the flow of gaseous refrigerant upwardly through vessel 11 impinges against the vanes and converts such impact forces into tangential force components which cause the screen assembly 17 to rotate as hereinafter more fully described.

To support screen assembly 17 for rotation within vessel 11, a support column or shaft 24 is supported coaxially within the vessel by an upper set of circumferentially spaced, radially extending ribs 25 and a lower set of circumferentially spaced, radially extending ribs 26. Each of the ribs 25 and 26 are secured, as by welding or other suitable means, at one end to shaft 24 and at the opposite end to shell 11. Shaft 19 of screen assembly 17 is mounted coaxially within shaft 24 and is supported for rotation by an upper bearing 27 and a lower thrust bearing 28. Shaft 24 has a diameter slightly smaller than the internal diameter of tubular shaft 19 so as to permit free rotation of shaft 19 about shaft 24 without objectionable lateral movement or wobble. Two adjustable collars 29 are secured to shaft 19, as by set screws or other suitable means, so as to bear against one of the races of each of the bearings 27 and 28.

To minimize the possibility of re-entrainment of oil after the gaseous refrigerant passes screen assembly 17, an annular baffle is secured to shell 11 adjacent ribs 25 and above screen 18.

The lower or bottom portion of vessel 11 serves as a reservoir for disentrained oil or other deleterious material separated from the gaseous fluid which reservoir is maintained at a predetermined level by a float valve 31 secured to an oil outlet connection 32 with the float 33 of the valve extending into vessel 11. The float valve 31 controls flow of oil to a pipe 34 which is connected to a place of oil storage or use, such as the lubricating oil reservoir (not shown) of a compressor (not shown). If it is desired to drain vessel 11 for inspection or repair, a drain pipe 35 is secured to the bottom of vessel 11. A valve 36 is provided in pipe 35 to control flow of oil through the pipe.

In operation of separator 10, gaseous refrigerant is discharged centrally and upwardly into vessel 11 from inlet connection 12. The gaseous refrigerant flows upwardly into impingement against vanes 21, thereby imparting rotation to screen 18 and spiral flow to the gaseous fluid stream within screen 18. The centrifugal force component imparted to the fluid stream causes at least part of the fluid stream to flow into and through screen 18 to thereby disentrain oil particles from the fluid stream. The rotation of screen 18 continuously effects an unblinding of the screen by impelling the oil tangentially from the screen into impingement against the inner surface of shell 11 from where it readily flows to the bottom of vessel 11. As the gaseous refrigerant, which does not penetrate screen 18, leaves screen 18, it impinges against vanes 20, which impingement imparts additional rotational force to the screen and further centrifugal force to the fluid stream so that a substantial amount of the fluid stream is caused to impinge baffle 30 and thereby effect further disentrainment of oil. Downstream from baffle 30, the substantially clean refrigerant fluid flows from vessel 11 via outlet connection 15 to a place of use or storage (not shown), such as a condenser.

The oil collected and held up in the bottom of vessel 11 is discharged in controlled amounts, through outlet connection 32, by float valve 31 to pipe 34. From pipe 34 refrigerant fluid in conducted to a place of storage (not shown), such as the compressor lubricating oil storage tank.

It is believed now readily apparent that the present invention provides an improved separator wherein entrained material carry-over is minimal. It is a separator of relatively simple and compact construction.

I claim:
1. A separator for disentrainment of particles from a stream of gaseous fluid comprising an elongated substantially cylindrical vessel, a generally cylindrical open ended perforated screen rotatably mounted coaxially within said vessel and having its outer surface spaced from the inner surface of the latter, said screen being of a construction to allow free flow of fluid therethrough, said vessel having an inlet directed centrally towards one end of said screen and a gas outlet conduit located centrally beyond the other end of said screen and at one end of said vessel, a liquid outlet conduit at the other end of vessel, swirl vane means positioned across the ends of said screen and secured thereto and rotatably mounted in said vessel, said swirl vane means adjacent the inlet being positioned to be impinged upon by said fluid to rotate said screen, a baffle joined to said vessel adjacent the other end of said screen and extending inwardly to a position adjacent an outer end of said swirl vane means.

2. The apparatus of claim 1 wherein said cylindrical screen is of such diametric dimension as to be in close spaced relation to the inner surface of the vessel.

3. The apparatus of claim 1 wherein means for supporting the screen for rotation includes a stationary shaft supported coaxially within the vessel and the screen has an axial tubular shaft disposed coaxially on said stationary shaft.

4. The apparatus of claim 1 wherein said cylindrical screen is of such diametric dimension as to be in close spaced relation to the inner surface of the vessel and wherein said baffle is annular and is secured to the vessel wall.

5. The apparatus of claim 1 wherein the gaseous fluid inlet is in the bottom portion of the vessel, the gaseous fluid outlet is in the top portion of the vessel, and the bottom of the vessel serves as a reservoir for the collection of disentrained matter.

6. The apparatus of claim 1 and means for controlling the removal of matter from the lower portion of the vessel.

References Cited

UNITED STATES PATENTS

| Re. 20,672 | 3/1938 | Kopsa | 55—404 |
|---|---|---|---|
| 815,407 | 3/1906 | Cooper | 55—169 |
| 1,577,704 | 3/1926 | Fleming | 55—404 |
| 1,860,697 | 5/1932 | Traviss | 55—290 |
| 1,885,697 | 11/1932 | Fabbro | 261—83 |
| 2,889,007 | 6/1959 | Lunde. | |
| 3,336,733 | 8/1967 | Wisting | 261—89 |
| 924,561 | 6/1909 | Mecredy et al. | 261—89 |

FOREIGN PATENTS

| 601,750 | 5/1948 | Great Britain. |
|---|---|---|

HARRY B. THORNTON, *Primary Examiner.*

BERNARD NOZICK, *Assistant Examiner.*

U.S. Cl. X.R.

55—325, 337, 404, 432